United States Patent

[11] 3,602,109

| [72] | Inventor | Daniel C. Harrington<br>2844 Depew St., Denver, Colo. 80214 |
|---|---|---|
| [21] | Appl. No. | 847,157 |
| [22] | Filed | Aug. 4, 1969 |
| [45] | Patented | Aug. 31, 1971 |

[54] HIGHWAY SAFETY GUARD-ROLL BARRIER
6 Claims, 12 Drawing Figs.

[52] U.S. Cl. .................................................... 94/1.5,
    256/13.1
[51] Int. Cl. ................................................. E01c 23/16
[50] Field of Search ........................................... 94/1.5;
    256/13.1; 114/219; 61/48

[56] References Cited
UNITED STATES PATENTS

| 1,145,749 | 7/1915 | Claud | 114/219 |
|---|---|---|---|
| 1,795,247 | 3/1931 | Burns | 256/13.1 |
| 1,815,413 | 7/1931 | Lockwood | 114/219 |
| 2,562,957 | 8/1951 | Sipkin | 114/219 |
| 2,927,513 | 3/1960 | Dove | 94/1.5 |
| 3,145,685 | 8/1964 | Kulick | 114/220 |
| 3,254,491 | 6/1966 | Levinton | 114/219 X |
| 3,416,484 | 12/1968 | Chapman | 94/1.5 X |
| 3,464,214 | 9/1969 | King | 61/48 |

FOREIGN PATENTS

| 1,234,017 | 5/1960 | France | 94/1.5 |
|---|---|---|---|

Primary Examiner—Nile C. Byers, Jr.
Attorney—Sheridan, Ross & Burton

ABSTRACT: Total barrier or guard-roll assembly comprises series of individual guard-roll barrier units spaced along one or both sides of a roadway. Each unit comprises support and guard structure rotatable about generally upright axis with upper portion closer to roadway axis to form overhang. When vehicle strikes one or more units they start rotating, attenuate impact, and redirect the vehicle. The overhand effect prevents climbing and keeps vehicle on ground. Impact surfaces are pneumatic low-pressure rubber tubes arranged to form frustocones rotating on vehicle spindle. They may also be of uniform diameter or may be single resilient conical bodies but are preferably series of heavy rubber tubes of variable diameter arranged to provide maximum surface to impacting vehicle. The attitude of the spindle may vary from vertical to permit use of uniform buffer elements.

Barrier elements may be arranged in tandem parallel to the road shoulder to intercept errant vehicles and promote straight line attenuation. For positive arrest, elements are deployed in lead-in lines in paired sequences to promote pocketing. Lateral spacing between paired elements converge to attenuate by actuating wringer effect. Special pocketing arrangements may be used to trap and decelerate trucks at critical locations.

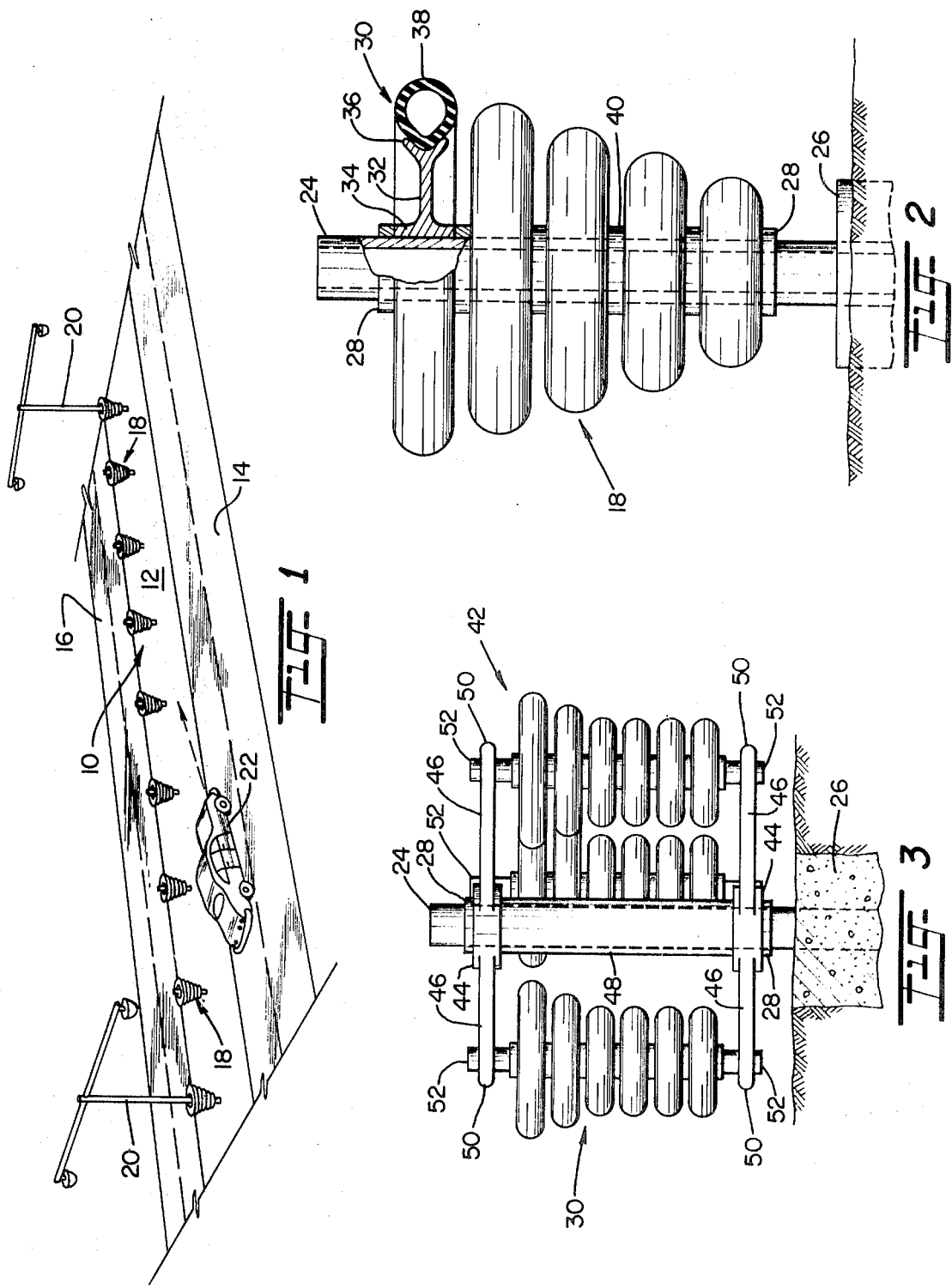

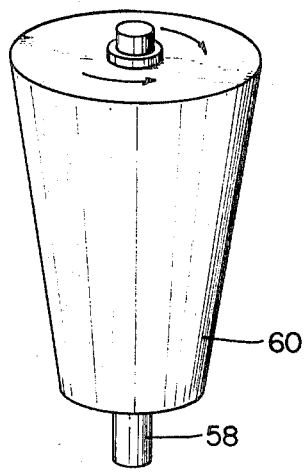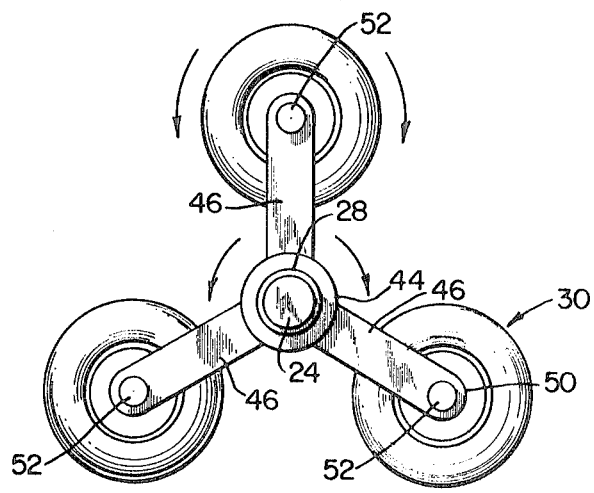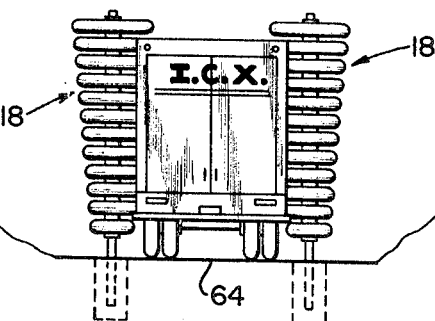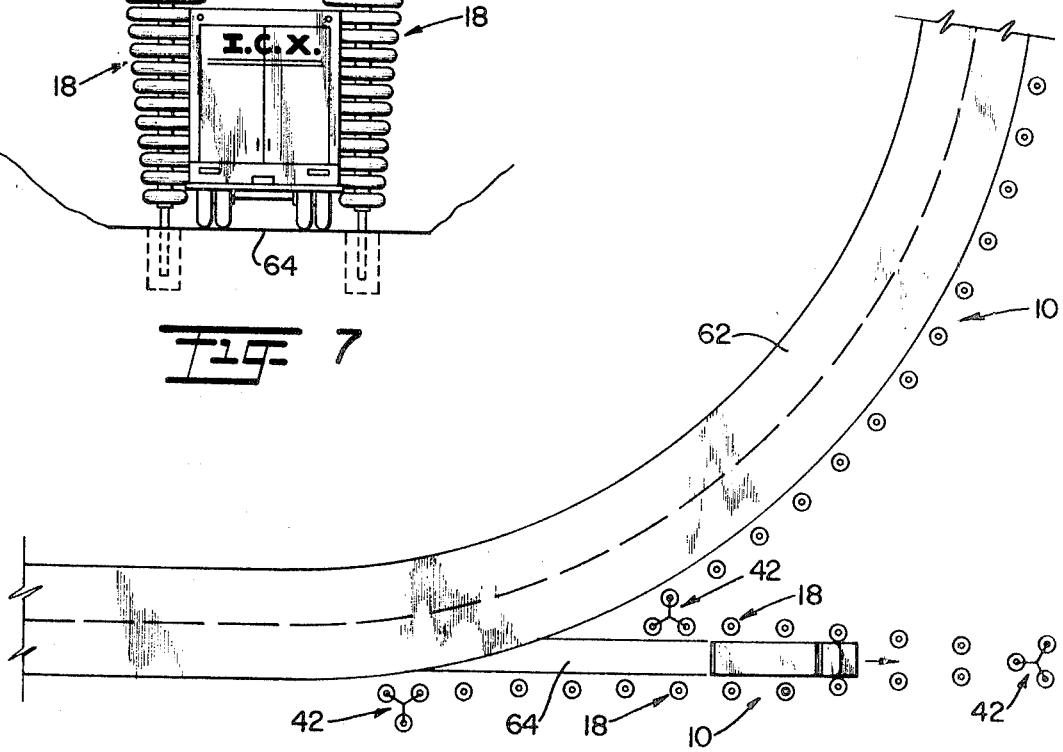

INVENTOR
DANIEL C. HARRINGTON

BY *Sheridan, Ross & Burton*

ATTORNEYS

HIGHWAY SAFETY GUARD-ROLL BARRIER

BACKGROUND OF THE INVENTION

This invention lies in the field of safety barriers for highways and other roadways of the general type which are mounted along the sides of the roadways to intercept errant vehicles and stop them or redirect them in a desired direction. It is directed particularly to such apparatus which suffers little or no damage from impact and which causes minimum damage to the contacting vehicle.

Many types of highway barriers have been proposed over the years and many varieties are presently in use. The conventional type is cable or metal plate, beam, or box beam guardrail mounted on posts parallel to shoulder lines of highways. Other types are heavy stone guardrails adjacent the highway, rustic log guardrails, and concrete barrier walls. These devices are mounted along the marginal limits and in the center medians to contain errant vehicles. Basically they are rigid, relatively nonyielding and have little capability for absorbing the energy of the impacting vehicle through elastic or plastic deformation of the barrier. Because of their rigidity and conformation, vehicles impacting them even at low angles of incidence are severely damaged by impact, catapulting, or richocheting, with attendant danger of exploding fuel from ruptured fuel tanks.

Another type, which is widely used in the medians or divider strips of freeways, is chain link or expanded-metal-type fencing mounted on metal posts designed to yield fairly readily and usually reinforced by a pair of vertically spaced horizontal cables. The theory of operation is that the concentrated force of impact of the errant vehicle stretches and distorts the metal, using up the inertia in the way of work. The yielding of the fence is intended to minimize damage to the vehicle. However, it has been found from experience that the vehicle still suffers a great deal of damage from the twisting and tearing action of the fence. In addition, a large section of fence is destroyed and the repair work amounts to several hundred dollars per accident.

To prevent head-on collision with bridge piers, abutments, traffic islands, etc., various protective devices are being used. Included are empty barrels, sand filled containers, water-filled containers, shock-absorbing rails, etc. All are destructive to the impacting vehicle. None pocket and stop the vehicle. Light standards, signposts, power poles, telephone poles, and traffic signal poles in the marginal areas flanking the traffic lanes are potential collision elements for errant vehicles. Both the vehicle and the objects encountered are damaged by impact. Many casualties result. Conventional protection of the objects comprises an enveloping guardrail or mounting them on raised concrete bases which protect the installations but severely damage the impacting vehicles and passengers. Barrier protectors are now being discontinued in favor of breakaway design of posts. This design permits impacting vehicle to shear the posts, minimizing vehicle damage, and reducing casualties. Although this device is an improvement over barrier protection, vehicles require costly repairs and the poles must be reinstalled. The proposed pneumatic guard rolls provide a better solution. The poles already in place can be made to serve as the spindle for the buffering elements.

SUMMARY OF THE INVENTION

The present invention overcomes these difficulties and provides a guide-roll barrier system which is practically permanent, suffering no damage except in very severe circumstances, and at the same time performing its function with little or no damage to the vehicle in the usual case. Conformation of the basic unit may be varied by adding additional buffering elements for height or varying the diameters. The most functional conformation is the inverted frustocone one which exerts a downward restraining force which prevents the climbing and catapulting of vehicles.

Generally stated, the barrier system is made up of a series of individual guide-roll barrier units of basically the same type which are arranged in longitudinally spaced relation along the side or sides of a roadway, including locations in a median between sections of a divided highway. Each unit comprises a support spindle anchored to the ground or a bridge abutment or the like and a guard structure or roller means mounted on the support for rotation about a generally upright axis, the roller means having a resilient surface for contact by an errant vehicle. The support includes a spindle on which the roller means is rotatably mounted and the latter may be a single body but preferably is a series of individual rollers, each of which is individually rotatable on the spindle.

In either event the unit is preferably so constructed and arranged that the contacting surfaces diverge upwardly from a vertical reference line passing through the base of the support in a direction toward the axis of the roadway to produce an overhang. In one form, the spindle is substantially vertical and the roller means enlarges upwardly to define an inverted frustoconical contour. In another form the spindle is upright but inclined toward the axis of the roadway, and the roller means may be of substantially constant diameter from end to end. In all forms the guard structure has a substantial vertical height, preferably of the order of 4 feet, thus enabling the upper portion to overhang the fender of body of the vehicle and exert a downward restraining force to keep it in firm contact with the ground.

In the presently preferred form, the guard structure comprises a series of individual rollers individually rotatable on a substantially vertical spindle. The rollers are low-pressure pneumatic tubes mounted on a hub, cone, or wheel, which is rotatably mounted on the spindle. The wheel carries a heavy hollow rubber tube filled with air at low pressure. Spacing collars are mounted on the spindle between the wheel hubs to maintain the tubes out of engagement with each other so that each may rotate independently when contacted by a vehicle. The resilience of the tube reduces the impact force and minimizes damage to the vehicle. In some cases standard automobile wheels may be used and equipped with worn tires instead of special tubes to reduce the cost of installation.

The barrier units are spaced closely enough so that in anything but a head-on approach the side of the vehicle will engage at least two of the units in a general broadside manner. The tangential contacts cause the rollers to rotate so that the vehicle is readily redirected substantially along the line of successive rollers. Considerable energy is used up in overcoming the inertia of the rollers, and this may be increased by the use of friction, magnetic, or other types of braking equipment.

For pocketing and arresting, the units are paired laterally to form an entrapping converging chute. As the side lines converge the vehicle is subjected to a wringer effect.

BRIEF DESCRIPTION OF THE DRAWINGS

Various other advantages and features of novelty will become apparent as the description proceeds in conjunction with the accompanying drawings, in which:

FIG. 1 is a schematic perspective view of a section of divided highway with a median barrier made in accordance with the invention;

FIG. 2 is an elevational view, partly in section, of a basic form of the guard-roll barrier unit using small tires for the buffering elements;

FIG. 3 is an elevational view of a cluster-type unit with a plurality of roller sets;

FIG. 4 is a top plan view of the unit shown in FIG. 3;

FIG. 5 is a front perspective view of a unitary roller unit;

FIG. 6 is a schematic plan view of a section of roadway having an escape chute provided with the barriers;

FIG. 7 is a schematic rear elevational view of a truck in the escape chute of FIG. 6;

DESCRIPTION OF PREFERRED EMBODIMENTS

Figure 8:
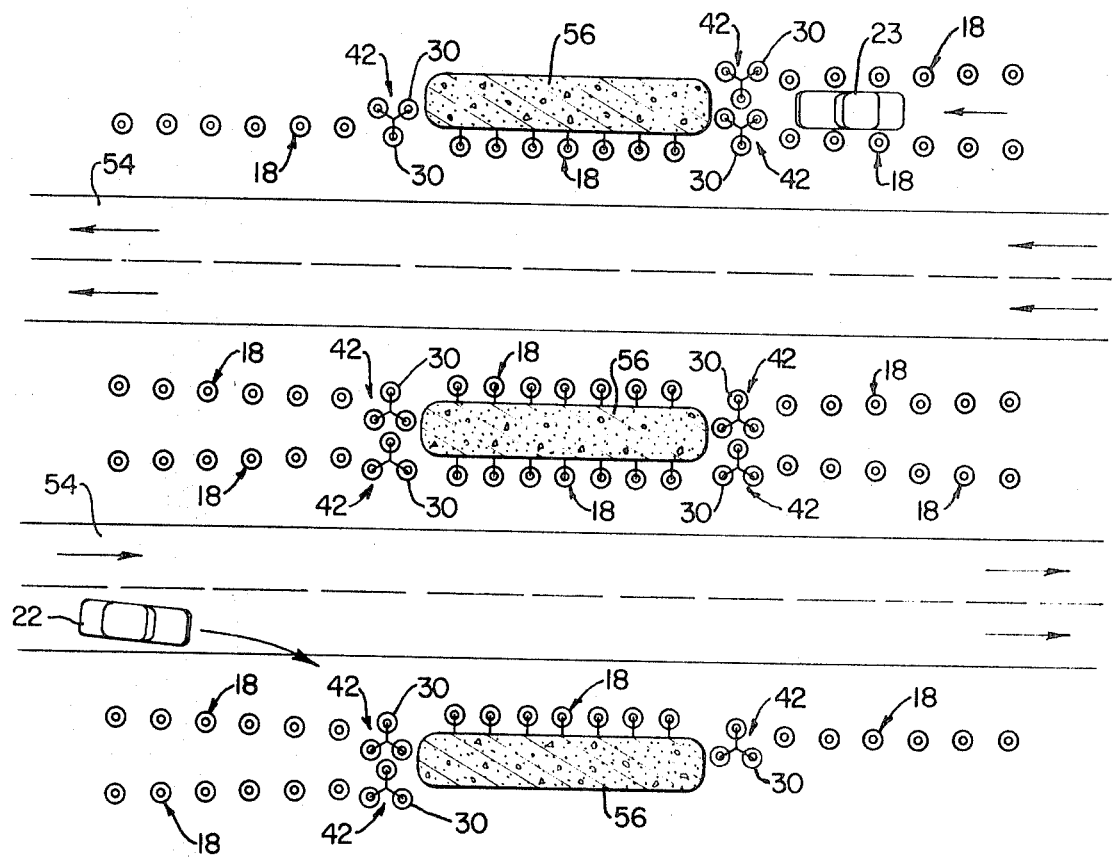
FIG. 8 is a schematic plan view of a section of roadway adjacent an abutment or pier guarded by the cluster units of FIG. 3, and guide-roller units bracket-mounted on the pier.
Figure 8A:
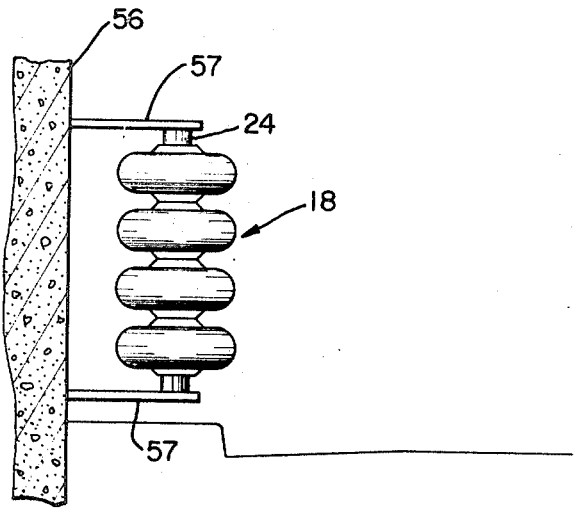
FIG. 8a is a side elevational view of a guide-roll unit bracket-mounted on an abutment.

The schematic view of FIG. 1 illustrates the arrangement of a typical barrier 10 in accordance with the invention mounted along the center of a median 12 between two roadway strips 14 and 16 constituting a divided highway. The intermediate guard-roll barrier units 18 are individually fixedly anchored to the ground while the end units are mounted on light standards 20. An errant vehicle 22 is shown leaving roadway 14 and about to be intercepted by the barrier.

Whether or not the heading of the vehicle is corrected by the driver, it will strike the barrier units more or less broadside with a considerable component of forward motion. The contact will cause the roller units to rotate about their upright axes and the vehicle will be slowed down to some extent by overcoming their inertia. At the same time, the rolling contact will redirect the vehicle generally along its proper course. Because of the vertical extent and overhang of the units a downward restraining force is applied to the vehicle which prevents it from climbing or catapulting over the barrier. The resilient surfacing of the guard structures greatly reduces the impact effect an possible damage to the vehicle.

A single basic guard-roll barrier unit of the presently preferred type is illustrated in FIG. 2 where it will be seen that the support comprises a substantially vertical spindle 24, which may be heavy-duty steel pipe, embedded in a block of concrete 26 or other suitable anchorage. Collars 28 are fixed to the spindle at the top and bottom of the guard-roll structure to maintain it in proper position.

The guard-roll structure itself is made up of a series or plurality of individual rollers 30 mounted for individual or collective rotation on spindle 24. Each roller includes a wheel 32 having a hub 34 mounted on the spindle and a rim 36 on which is mounted the hollow air-filled rubber tube 38 to provide the desired resiliency. Collars 40 are loosely mounted on the spindle between the wheel hubs to provide spacing between the tubes. Each upwardly successive roller is larger than the one below to define an inverted generally frustoconical contour which provides the overhang to exert the downward restraining force.

Figure 2A:
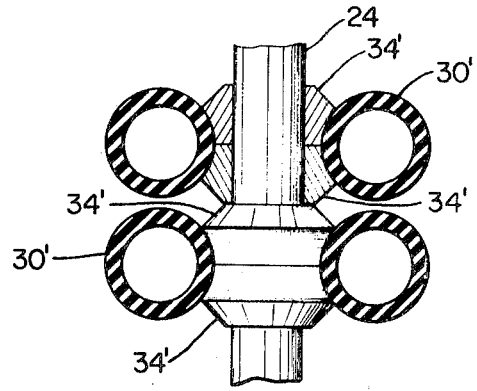
FIG. 2a is a sectional elevational view of an alternate guard-roll unit using large pneumatic buffering elements.

An alternate modification of the guard-roll unit is shown in FIG. 2a using large diameter tubes for rollers of the size presently available. The tubes 30' have an optimum diameter 31½ times the diameter of the spindle. The tubes 30' are rotatably mounted on the spindle 24 by means of hubs or cones 34' which are rotatably mounted on spindle 24. The hubs 34' are flat on one end with an outward bevel on the other end. They are positioned on the spindle with their flat ends adjacent so that their curved peripheries cooperate to form a curved surface into which the tube 30' fits. Each hub has an outward bevel at its other end so that when the beveled ends of two hubs are mated it results in the tubes 30' being spaced apart. The hubs 34' may be constructed of plastic, hard rubber, fiberglass-impregnated material or other suitable moldable material. In assembling, the first cone is placed over the spindle with the bevel down, the roller 30' positioned on the spindle and the next cone 30' positioned over the spindle with its flat side down.

A modified form of guide-roll barrier unit is illustrated in FIGS. 3 and 4. In this form, spindle 24 is provided with fixed collars 28 retaining between them a cluster unit 42. This unit includes upper and lower spiders or frames with hubs 44 and arms 46 separated by a tubular spacer 48. At the free ends 50 of the arms are connected the upper and lower ends of secondary spindles 52, on each of which is mounted a series of graduated rollers 30 in the same general manner as in FIG. 2. The entire cluster is rotatable on hubs 44 about the axis of spindle 24.

The cluster unit may be used in locations where a vehicle is likely to approach in a more head-on attitude such as at the beginning of a barrier row or at a fixed object such as a bridge abutment as indicated in FIG. 8. Here a roadway 54 is shown as passing between a pair of bridge abutments 56 which are close to its margin. Clusters 42 are mounted as shown at each likely approach. A vehicle 22 at the left is shown as swerving toward the abutment 56 and it will strike one of the roller units 30 and cause the cluster to rotate clockwise. The succeeding bracket-mounted roller unit will then engage the side of the vehicle and the two units will redirect the vehicle substantially parallel to the roadway. Another vehicle 23 is shown at the right end which has swerved deeper and in between the converging rows of barrier units where it will be decelerated by the wringer effect of the guide-roll units.

Referring to FIG. 82, the guard-roll unit 18 is bracket-mounted to the face of a pier or abutment 56 by means of bracket members 57 having one of their ends embedded in the abutment 56 and their other ends attached to respective ends of spindle 24.

Another modification is shown in FIG. 5 where spindle 58 rotatably mounts roller means 60 which is in the form of a single body of revolution defining an inverted frustocone. It may be provided with a solid core and a resilient covering layer or it may be a hollow rubber body filled with air or foam rubber. It has the same effective form as the types previously discussed and operates in the same manner.

FIGS. 6 and 7 illustrate a special barrier arrangement of great utility in connection with escape chutes such as are provided for runaway trucks in mountainous areas. In FIG. 6 a typical curved highway 62 is shown provided with an escape chute 64 which in effect is an unimproved roadway leaving the main highway on a tangent to the beginning of the curve to allow runaway trucks or other vehicles to leave the highway and roll to a stop.

Each side of the escape chute roadway is lined with a standard barrier 10 made up of guard-roll barrier units 18 differing only in the fact that they are higher than a conventional truck, as indicated in FIG. 7. At the entrance end are located the special cluster units 42 which will guide the truck into the lane if it is laterally beyond the margin of the road. The initial laterally opposed units are laterally spaced sufficiently to allow easy access but each succeeding set of opposed units is progressively more closely spaced so that they progressively produce more lateral pressure or a "squeezing" or "wringer" effect on the truck. Thus more energy is required to pass between each successive set and the truck is rapidly decelerated to a halt. At the same time, since the upper rollers of the units are also progressively closer together they produce a greater downward pressure on the truck, increasing its traction.

Figure 10:
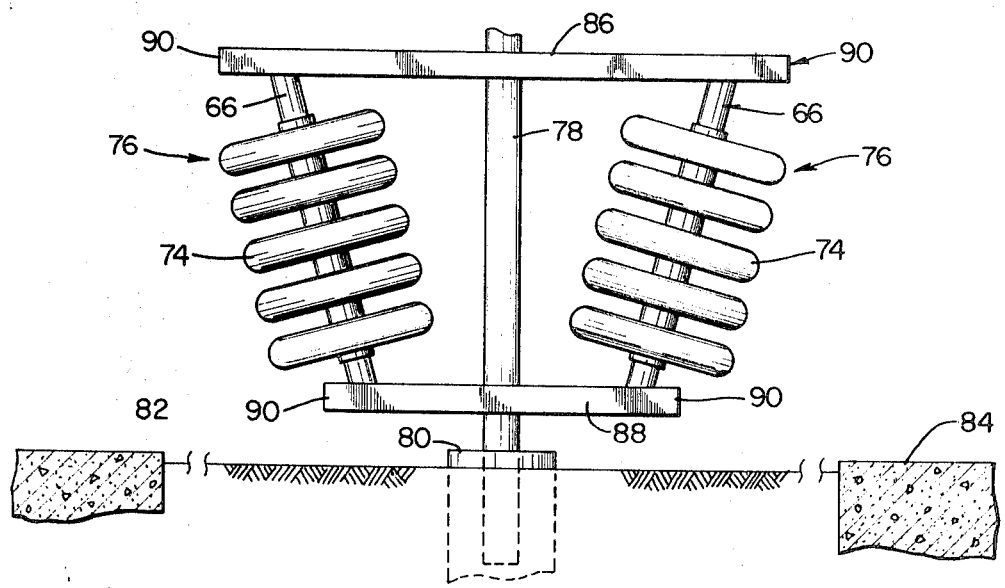
FIG. 10 is an elevational view of a further modified form of the invention.
Figure 9:
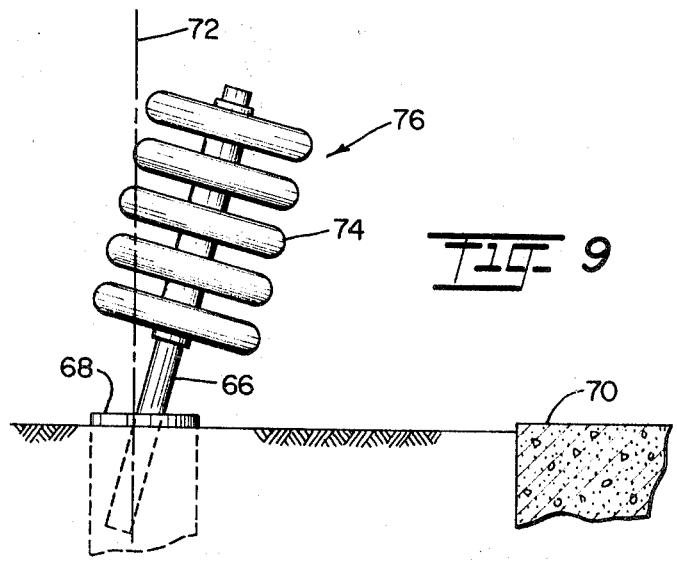
FIG. 9 is an elevational view of a modified form of the invention.

A modified form of the basic guard-roll barrier unit is shown in FIGS. 9 and 10 to accomplish the overhang feature without requiring the use of graduated wheels and tubes. In FIG. 9 the unit 76 includes a spindle 66 shown as anchored in a block of concrete 68 adjacent to a roadway 70 and the spindle is set to diverge upwardly from a vertical reference line 72 passing through the base of the support, the divergence being toward the axis of the roadway. Individual roller units 74 are rotatably mounted on spindle 66 in the same general manner as in FIG. 2, and are similarly composed of wheels and rubber tubes. Because of the tilt of the spindle, the upper portion of the guard structure lies closer to the axis of the roadway than does the lower part, even though all of the rollers are of substantially the same diameter, and the desired overhang is produced.

The device of FIG. 9 is adapted to be arranged for a dual purpose as shown in FIG. 10. Here a vertical post 78, such as a light standard, is mounted in a concrete block 80 centrally between roadways 82 and 84 of a divided highway. Two crossarms 86 and 88 are mounted on the pole and two units 76 are attached by their spindles 66 to the outer ends 90 of the crossmembers. Thus, one of the units serves each of the roadways. It will be understood that the devices of FIGS. 9 and 10 are arranged in rows as in FIG. 1 to define complete barriers.

The construction of FIG. 10 may be modified to have crossmembers 86 and 88 in the form of spiders with three or more arms and roller units and to mount the crossmembers for rotation about pole 78 to perform the same functions as the cluster unit 42 of FIGS. 3 and 4. Similarly, cluster unit 42 may be formed with only two arms and fixed to spindle 24 to serve as a dual-purpose barrier unit like the device of FIG. 10.

I claim:

1. A highway safety guide-roll barrier unit adapted to be substantially vertically mounted in an automobile traffic area comprising: a spindle; at least one roller having an internal convex rim for rotatably mounting on said spindle; a two-section hub rotatably mounted on said spindle with the sections mating to form a total concave outer surface or circular groove into which said convex rim nests; said unit being assembled by placing a first or lower hub section on said spindle with its mating surface uppermost, placing said roller over said spindle with its convex hub nesting in the concave half surface of said first hub section, and placing a second or upper hub section on said spindle with its mating surface mating with the mating surface of said first hub section so that the convex section of said roller hub nests in the total concave surface of said hub with the second or upper hub section locking the roller in place.

2. The guide-roll barrier unit of claim 1 in which the outer ends of said hub sections are flat and there is a beveled area between them and the grooved area, each of said flat ends adapted to mate with the flat end of an adjacent hub section when a plurality of rollers are mounted on their corresponding hubs on said spindle.

3. A highway safety barrier comprising: a series of guard-roll units adapted to be mounted in longitudinally spaced relation adjacent to the margin of a roadway; each guard-roll unit including a support and a guard structure having a substantial vertical extent and being movably mounted on the support for rotation about a generally upright axis; said guard-roll unit being so constructed and arranged that the upper portion of the rotatable guard structure extends laterally closer to the axis of the roadway than does the lower portion thereof to exert a downward restraining force on a contacting vehicle, said barrier including a series of guide-roll barrier units along each side of a roadway to define an escape chute for runaway vehicles; the lateral spacing between opposing guide-roll barrier units of the two series being selected to provide for contact of both series simultaneously by the sides of a runaway vehicle; said units being laterally yieldable to permit entry and longitudinal movement of the vehicle while applying decelerating force thereto.

4. A highway safety barrier comprising: a series of guard-roll units adapted to be mounted in longitudinally spaced relation adjacent to the margin of a roadway; each guard-roll unit including a support and a guard structure having a substantial vertical extent and being movably mounted on the support for rotation about a generally upright axis; said guard-roll unit being so constructed and arranged that the upper portion of the rotatable guard structure extends laterally closer to the axis of the roadway than does the lower portion thereof to exert a downward restraining force on a contacting vehicle, said barrier including a series of guide-roll barrier units along each side of a roadway to define an escape chute for runaway vehicles; the lateral spacing between opposing guide-roll barrier units of the two series being selected to provide for contact of both series by the sides of a runaway vehicle; said units being laterally yieldable to permit entry and longitudinal movement of the vehicle while applying decelerating force thereto, with the lateral spacing between opposing barrier units progressively decreasing from the entrance end of the escape chute toward the opposite end thereof to progressively increase lateral pressure and decelerating force on the vehicle and also progressively increase downward pressure on the vehicle to improve its traction.

5. A guard-roll barrier unit for use in a highway safety barrier, comprising: a support to be anchored at its bottom end; and a plurality of wheellike members, each having a pressurized pneumatic-tube member encircling the periphery thereof, said members being vertically spaced and individually rotatably carried by said support and disposed in a substantially vertical stack, the tube members increasing in diameter from the bottom to the top of the stack to form a generally frustoconical configuration which exerts a substantial downward component of force on a vehicle impacting the stack, the tubes being of sufficient size to absorb a material portion of the energy of impact and minimize damage to the barrier unit and the vehicle.

6. A guard-roll barrier unit for use in a highway safety barrier, comprising: a support and a guard structure having a substantial vertical extent and being movably mounted on the support for rotation about a generally upright axis; said structure having resilient-contact surfacing for engagement by an errant vehicle; said guard-roll barrier unit being so constructed and arranged that the guard structure diverges upwardly in at least one lateral direction from a vertical reference line passing through the base of the support, said support comprising a substantially vertical spindle; aid guard structure including a pair of frames mounted in vertically spaced relation on said spindle for rotation about the major spindle axis; each frame having a plurality of arms extending generally radially from the spindle axis; secondary spindles extending between the free ends of vertically registered arms; and roller means mounted on each of said secondary spindles for rotation about the major axes of said secondary spindles.